(12) United States Patent
Chen

(10) Patent No.: US 8,588,310 B2
(45) Date of Patent: Nov. 19, 2013

(54) METHOD AND APPARATUS FOR MANAGING DELIVERY OF BITS TO A DECODER

(75) Inventor: Jing Yang Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 345 days.

(21) Appl. No.: 12/872,931

(22) Filed: Aug. 31, 2010

(65) Prior Publication Data
US 2012/0051436 A1 Mar. 1, 2012

(51) Int. Cl.
*H04N 7/26* (2006.01)

(52) U.S. Cl.
USPC ................................ 375/240.25; 375/240.01

(58) Field of Classification Search
USPC .................................................. 375/240–241
See application file for complete search history.

(56) References Cited

U.S. PATENT DOCUMENTS

| | | | |
|---|---|---|---|
| 8,036,266 B2* | 10/2011 | Kayashima et al. | 375/240.01 |
| 2002/0159530 A1* | 10/2002 | Olson et al. | 375/240.29 |
| 2003/0002609 A1* | 1/2003 | Faller et al. | 375/372 |
| 2003/0123855 A1* | 7/2003 | Okada et al. | 386/98 |
| 2004/0066847 A1* | 4/2004 | Adachi et al. | 375/240.13 |
| 2006/0093045 A1* | 5/2006 | Anderson et al. | 375/240.28 |
| 2006/0104356 A1* | 5/2006 | Crinon | 375/240.12 |

* cited by examiner

*Primary Examiner* — Christopher S Kelley
*Assistant Examiner* — Jonathan Messmore
(74) *Attorney, Agent, or Firm* — Thomas A. Ward

(57) ABSTRACT

A method for managing delivery of encoded bits to a decoder is disclosed. In the method, a number of bits associated with a variable system delay is determined. The variable system delay is a time interval between each of a plurality of frames being encoded and decoded and is measured with respect to a current time for each of the plurality of frames. A number of bits in an encoder buffer for an encoder is determined. A number of bits in a decoder buffer for a decoder configured to receive encoded bits from the encoder is determined based on the bits associated with the variable system delay and the bits in the encoder buffer. Delivery of the encoded bits to the decoder is managed based on the number of bits determined to be in the decoder buffer.

10 Claims, 10 Drawing Sheets

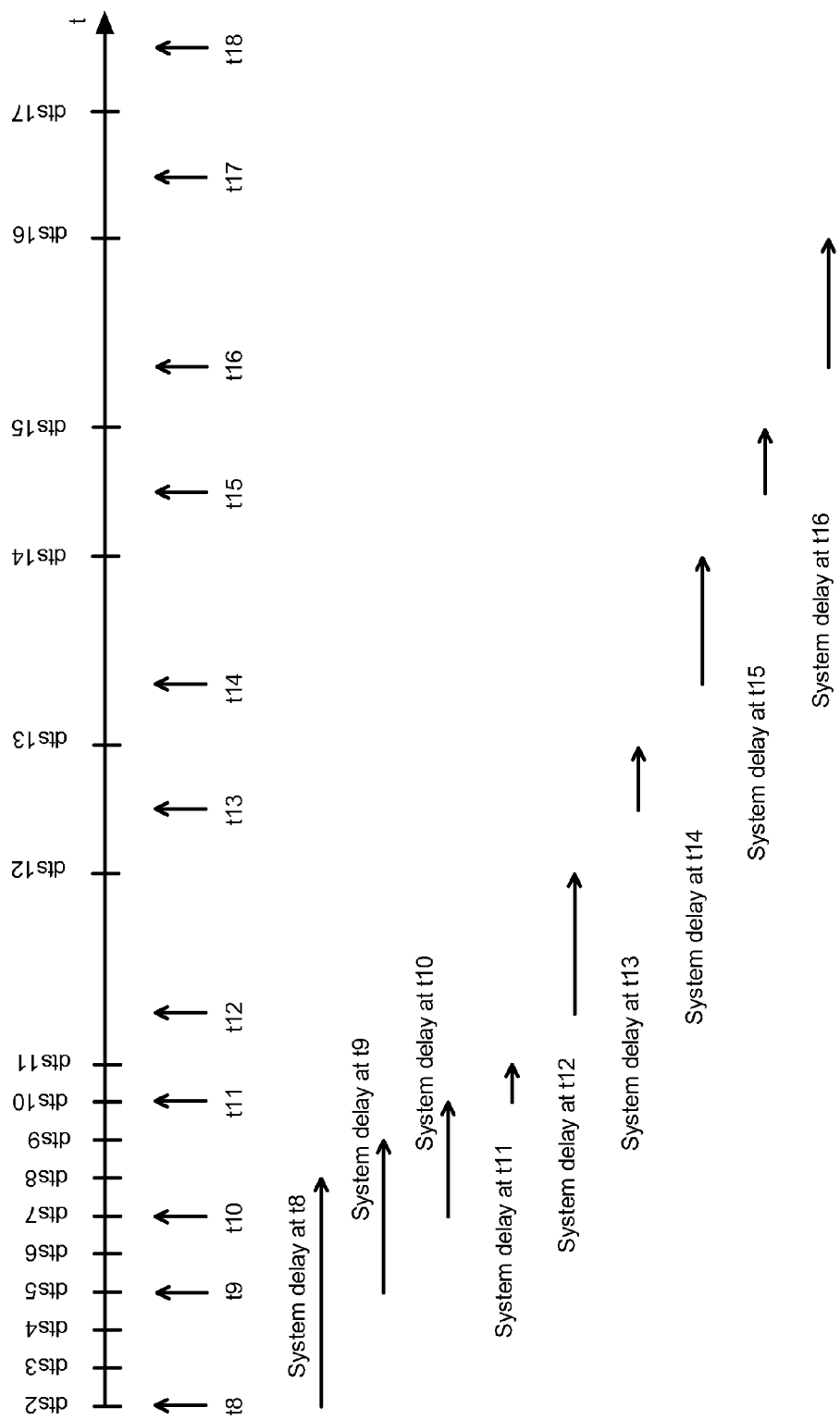

METHOD AND APPARATUS FOR MANAGING DELIVERY OF BITS TO A DECODER

BACKGROUND

Motion picture photography or film has a rate of 24 frames per second. Every frame itself is a complete picture, also known as a "progressive frame." This means that all of the fields, top and bottom, correspond to the same instant of time.

Video signals, on the other hand, may have a progressive frame structure or an interlaced structure. An interlaced frame is divided into top and bottom fields, and scanning of one field does not start until the other one is finished. Moreover, video signals have a different frame rate than film. The National Television System Committee (NTSC) standard (used primarily in North America) uses a frame rate of approximately thirty frames per second for interlaced video. The phase alternate line (PAL) standard (used in most of the rest of the world) uses a frame rate of twenty-five frames per second. Progressive video uses a frame rate of 60 frames per second.

The different frame rates used by film and video complicate the conversion between the two formats. In order to solve the problem of having extra video frames when converting film to be shown on progressive television for example, a telecine process converts two frames of film into five frames of video. One method of performing this process involves converting a first frame of film into three frames of video and a second frame of film into two frames video. That is, the first frame of film is repeated twice and the second frame of film of repeated once. Because of the 3-2 pattern, the process is often called 3-2 pulldown. In the 3-2 pulldown, every two film frames are converted into five frames.

The repeated or duplicate frames in the telecine process enable the viewing of film materials in the video format. However, in some applications, it is desirable to remove the duplicate frames. For example, the repeated frames do not contain new information and should be removed before encoding (compression). An inverse telecine process, also referred to as a detelecine process, converts a video signal back to a film format. The inverse telecine process takes incoming video, which is presumed to have been generated from film source material, and outputs the original frame images so that they can be encoded. By removing repeated frames from the video material, the encoding process can be made more efficient, and ultimately the amount of the resulting data can be greatly reduced.

In the inverse telecine process, video is known to be input to an inverse telecine detector, which detects and drops any repeat frames. The inverse telecine detector also inserts flags into the video stream to indicate to an associated decoder that certain frames should be repeated at the appropriate time. The frames associated with repeat frames may be referred to as "film frames". The frames that are not associated with any repeat frames may be referred to as "video frames". The film frame has a time duration that is equal to the sum of the time durations of either three video frames or two video frames depending on how many times the film frame should be repeated. The frames are then stored in an encoder pipeline delay buffer before they are sequentially delivered to the input of a video encoding engine, which performs the actual encoding. The time interval from the time a frame is captured in the pipeline delay buffer to the time that the frame is encoded by the encoding engine may be referred to as "pipeline delay". After the pipeline delay, frames that entered the pipeline delay buffer are delivered to the encoding engine. The encoding engine conveys the current time using a program clock reference (PCR) and the decoding time of each frame using a decode time stamp (DTS) to an associated decoder. The time interval from the time a frame is delivered to the encoding engine to the time that the frame is decoded by the associated decoder may be referred to as a "system delay". If the time a frame delivered to the encoding engine is delayed, the system delay associated with this frame is reduced. The buffer and encoding engine operate under the control of a processor, which establishes the video pipeline that delivers the frames from the buffer to the encoder engine.

The encoder is configured to select an initial system delay. For example, the encoder may select the initial system delay to be 1 second. The encoder initializes the PCR at the encoding time of the first frame to be the DTS of the first frame minus the initial system delay. The value of the PCR is thereafter incremented and synchronized to the input video clock. The encoder is also configured to synchronize its system time clock (STC) to the input video clock. The encoder initializes the DTS of the first frame to be the STC at the encoding time of the first frame. The encoder thereafter calculates the DTS of a current frame by adding the duration of the previous frame to the DTS of the previous frame in the encoding order. For example, the DTS of a second frame is equal to the DTS of the first frame plus the duration of the first frame. The duration of each frame is measured by the input video clock.

There are two ways in which the pipeline may be filled. For progressive video, one is video frame based, the other is film frame based. For the video frame based pipeline, the repeat frames enter and propagate down the pipe as if the repeat frames have not been dropped. When a repeat frame enters a processing stage, the process is not performed. In this way each of the frames in the pipe continue to incrementally move along the pipeline as if no frames have been dropped, thus the pipeline delay is constant. At any instance during the processing of the video, some processing stages may skip the process for 2-video frame time, some may skip for 1-video frame time, and others may not skip. The management of the video frame based pipeline is relatively more involved, but the system delay is constant. For the film frame based pipeline, the repeat frames do not enter the pipe. Instead, when a repeat frame is detected, the entire pipeline stalls for a video frame time. In this way, the frames in the pipe stop moving along the pipeline for a video frame time. In the case of 3-2 pulldown, for every five video frames that are to be encoded three are dropped (i.e., only two frames are encoded). If the pipeline has a duration of one second, by the time the last frame in the pipeline begins to be encoded, the pipeline will have been delayed by ⅗ of a second, or 600 ms. Since the frames to be delivered to the encoding engine are delayed, the system delay is reduced. As a result of this reduction, the encoder may not have enough time to transmit the encoded bits of the entire frame to the decoder prior to the decoding time. The management of the film frame based pipeline is much simpler. However, the system delay under the film frame based pipeline is varied. The variation in the system delay for each frame is known to increase a difficulty of maintaining a required bit rate to prevent decoder buffer underflow.

SUMMARY

Disclosed herein is a method for managing delivery of encoded bits to a decoder, according to an embodiment. In the method, a number of bits associated with a variable system delay is determined. The variable system delay is a time interval between each of a plurality of frames being encoded and decoded and is measured with respect to a current time for each of the plurality of frames. A number of bits in an encoder buffer for an encoder is determined. A number of bits in a decoder buffer for a decoder configured to receive encoded bits from the encoder is determined based on the bits associated with the variable system delay and the bits in the encoder buffer. Delivery of the encoded bits to the decoder is managed based on the number of bits determined to be in the decoder buffer.

Also disclosed herein is an apparatus for managing delivery of encoded bits to a decoder, according to an embodiment. The apparatus includes one or more modules configured to determine a number of bits associated with a variable system delay. The variable system delay is a time interval between each of a plurality of frames being encoded and decoded and is measured with respect to a current time for each of the plurality of frames. The one or more modules are also configured to determine a number of bits in an encoder buffer for an encoder, and determine a number of bits in a decoder buffer for a decoder configured to receive encoded bits from the encoder based on the bits associated with the variable system delay and the bits in the encoder buffer. The one or more modules thereafter manage delivery of the encoded bits to the decoder based on the number of bits determined to be in the decoder buffer. The apparatus also includes a processor configured to implement the one or more modules.

Further disclosed is a computer readable storage medium on which is embedded one or more computer programs implementing the above-disclosed method for managing delivery of encoded bits to a decoder, according to an embodiment.

In the method disclosed herein, two decoder buffer models may be implemented. A first decoder buffer model may be used to manage a transmission bit rate, for instance, the first decoder buffer model may be used to calculate the current capacity utilization of the decoder buffer. The multiplexer processor may use the first decoder buffer model to determine a maximum transmission bit rate and a minimum transmission bit rate of the encoder. This determination is based on the current capacity utilization of the decoder buffer. In addition, the maximum transmission bit rate is a maximum rate of the multiplexer above which causes the decoder buffer to overflow. The minimum transmission bit rate is a minimum rate of the multiplexer, below which causes the decoder buffer to underflow. A second decoder buffer model may be used by the video processor to determine a maximum frame size for a current frame to be encoded. The maximum frame size determination is based on a future capacity utilization of the decoder buffer when the current frame is to be decoded. The maximum frame size of the frame to be encoded is equal to the capacity utilization of the decoder buffer at the time the current frame is decoded.

As described above, the embodiments disclosed herein provide an encoder with variable system delay, including those using interlaced and progressive processing pipelines, with an initial system delay and decoder buffer models that substantially avoid decoder buffer underflow.

BRIEF DESCRIPTION OF THE DRAWINGS

Features of the present invention will become apparent to those skilled in the art from the following description with reference to the figures, in which:

FIG. 4B illustrates a decoder model at an encoder during late transition from video to film, according to an embodiment;

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
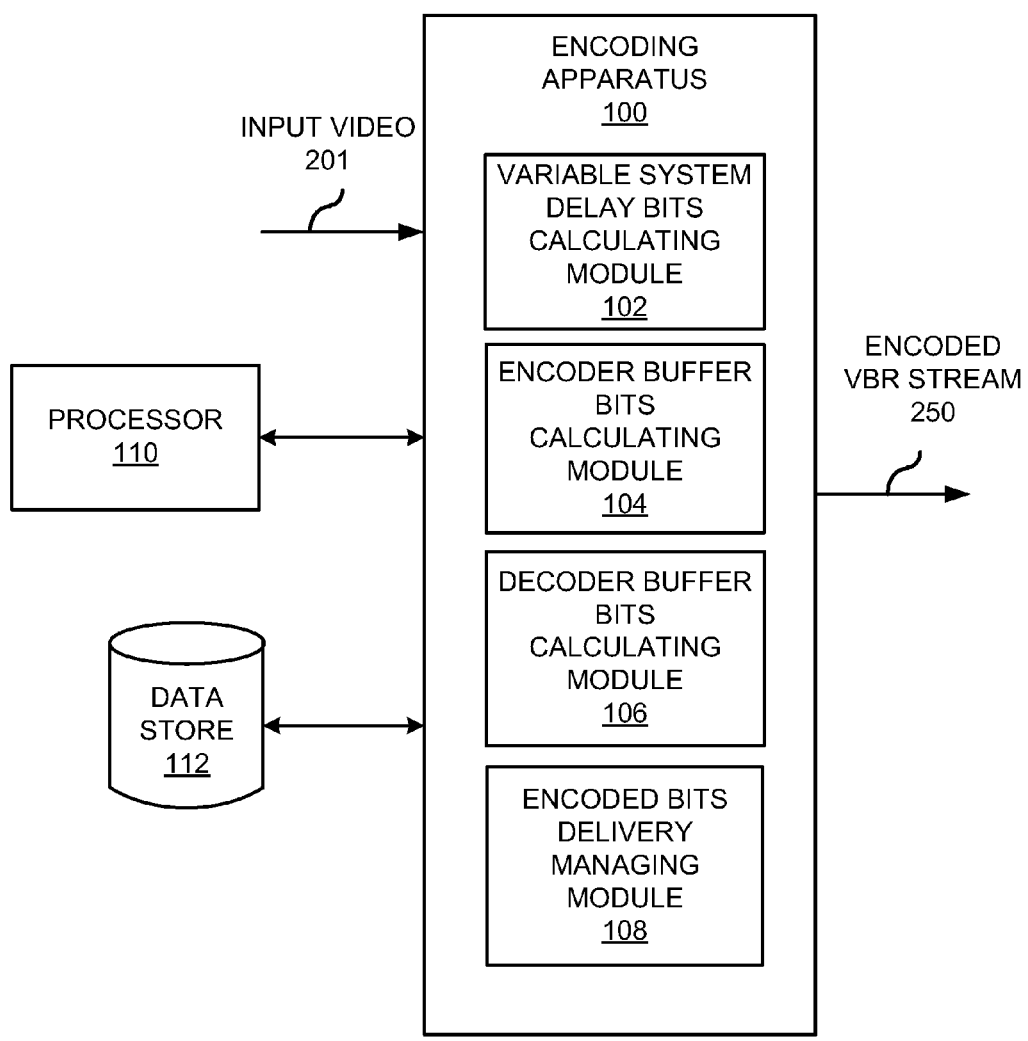
FIG. 1 illustrates a simplified block diagram of an encoding system, according to an embodiment.

FIG. 1 illustrates a simplified block diagram of an encoding system 100 configured to manage delivery of encoded bits to a decoder, according to an embodiment. It should be understood that the encoding system 100 depicted in FIG. 1 may include additional components and that some of the components described herein may be removed and/or modified without departing from a scope of the encoding system 100.

The encoding system 100 is depicted as including a variable system delay bits calculating module 102, an encoder buffer bits calculating module 104, a decoder buffer bits calculating module 106, and an encoded bits delivery-managing module 108. The modules 102-108 may comprise software modules, hardware modules, or a combination of software and hardware modules. Thus, in one embodiment, one or more of the modules 102-108 comprise circuit components. In another embodiment, one or more of the modules 102-108 comprise software code stored on a computer readable storage medium, which is executable by a processor. As such, in one embodiment, the encoding system 100 comprises a hardware device. In another embodiment, the encoding system 100 comprises software stored on a computer readable medium.

The variable system delay bits calculating module 102 is configured to calculate a number of bits associated with a variable system delay. The variable system delay is a time interval between each of a plurality of frames being encoded and decoded and is measured with respect to a current time for each of the plurality of frames. According to an embodiment, the variable system delay bits calculating module 102 may be configured to calculate the bits generated in a preceding time interval. The preceding time interval may be referred to as "last system delay". In addition, the preceding time interval is equal to the initial system delay, as described in detail with respect to FIG. 6 and the method 600 hereinbelow.

According to another embodiment, the variable system delay bits calculating module 102 may also be configured to calculate the bits to be transferred in a next time interval. The next time interval may be referred to as "next system delay". In addition, the next time interval is equal to the system delay associated with the frame to be encoded, as described in detail with respect to FIG. 7 and the method 700 hereinbelow.

The encoder buffer bits calculating module 104 is configured to determine a number of bits in an encoder buffer. For instance, the encoder buffer bits calculating module 104 may determine the number of bits in the encoder buffer by summing a number of bits for each frame in the encoder buffer.

The decoder buffer bits calculating module 106 is configured to determine a number of bits in a decoder buffer for a decoder configured to receive encoded bits from the encoder. The decoder buffer bits calculating module 106 determines the number of bits in the decoder buffer based on the bits associated with the variable system delay and the bits in the encoder buffer. The decoder buffer bits calculating module 106 may determine the number of bits currently stored in the decoder buffer by subtracting the bits in the encoder buffer from the bits generated in the last system delay, as described with respect to FIG. 6 and the method 600 hereinbelow. The multiplexer (MUX) processor may use the current capacity utilization of the decoder buffer to determine a maximum transmission bit rate and a minimum transmission bit rate of the encoder. In addition, the decoder buffer bits calculating module 106 may determine the number of bits in the decoder buffer at the decoding time of a frame to be encoded by subtracting the bits in the encoder buffer from the bits to be transferred in the next system delay, as described in detail with respect to FIG. 7 and the method 700 hereinbelow. The video processor may use the capacity utilization of the decoder buffer at the decoding time of a frame to be encoded to determine the maximum frame size of this frame.

The encoded bits delivery-managing module 108 is configured to manage delivery of the encoded bits to the decoder based on the number of bits determined to be in the decoder buffer. For instance, the encoded bits delivery-managing module 108 may reduce a transmission bit rate at a multiplexer associated with the encoder to maintain the capacity utilization of the decoder buffer within a predetermined decoder buffer threshold in proportionate response to the determination of the capacity utilization. Alternately, the encoded bits delivery-managing module 108 may encode the frame at the encoder using a number of bits to maintain the capacity utilization of the decoder buffer at the time the frame to be currently encoded will be decoded within a predetermined decoder buffer threshold in proportionate response to the determination of the capacity utilization. The encoding system 100 also includes a processor 220 configured to implement the one or more modules 102-108.

The processor 110 may comprise a microprocessor, a micro-controller, an application specific integrated circuit (ASIC), and the like. In addition, the modules 102-108 may be configured to access a data store 112 that stores various information that the modules 102-108 may access. The data store 112 may comprise volatile and/or non-volatile memory, such as DRAM, EEPROM, MRAM, phase change RAM (PCRAM), Memristor, flash memory, and the like. In addition, or alternatively, the data store 112 may comprise a device configured to read from and write to a removable media, such as, a floppy disk, a CD-ROM, a DVD-ROM, or other optical or magnetic media.

Figure 2:
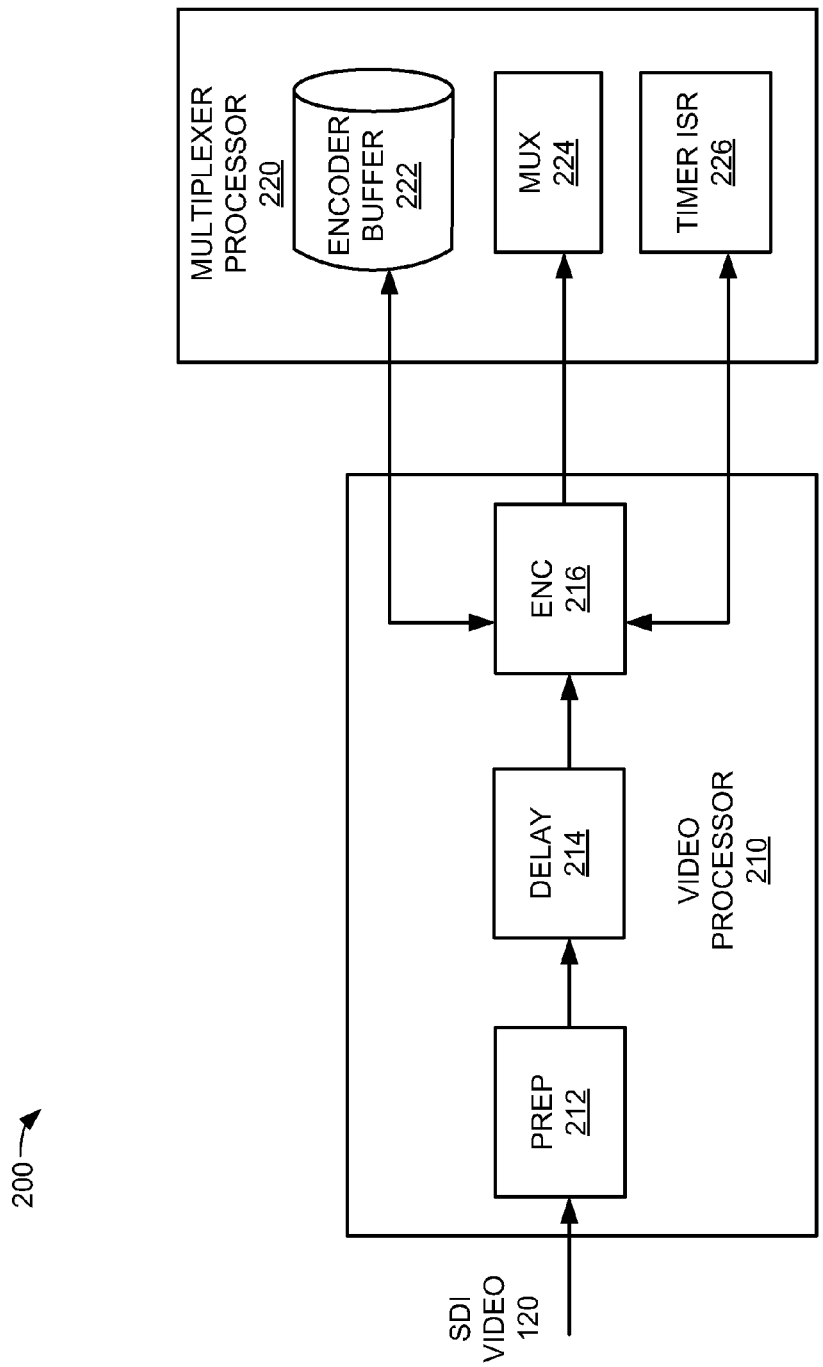
FIG. 2 illustrates a simplified block diagram of an encoding system, according to another embodiment.

FIG. 2 illustrates a simplified block diagram of an encoding system 200 configured to manage delivery of encoded bits to a decoder, according to an embodiment. The encoding system 200 is depicted as including a video processor 210 and a multiplexer processor 220. The video processor 210 includes a pre-processing stage (PREP) 212, a delay stage (DELAY) 214, and an encoding stage (ENC) 216. The multiplexer processor 220 includes a timer interrupt service routine (ISR) 226, a multiplexing process (MUX) 224, and an encoder buffer 222. It should be understood that the encoding system 200 depicted in FIG. 2 may include additional components and that some of the components described herein may be removed and/or modified without departing from a scope of the encoding system 200.

After a video frame is captured from input serial digital interface (SDI) video 120, the PREP 212 performs activities calculation, special events detection, and inverse telecine. After inverse telecine, the PREP 212 regroups the captured fields or frames into a film frame. For instance, in interlaced television, a film frame may contain 2 or 3 fields. In progressive television, a film frame may contain 2 or 3 video frames. The DELAY 214 delays the encoding processing by n frames. The ENC 216 encodes each frame and writes the bits of the encoding frame to the encoder buffer 222. The MUX 224 reads the encoding bits from the encoder buffer 222 and sends the bit stream to a decoder (not shown). The timer ISR 226 relays the video encoding bit rate to the ENC 216 and video transmission bit rate to the MUX 224. At each timer interrupt, the timer ISR 226 updates the bit rates. In a typical operation, the transmission bit rate is a delayed version of the encoding bit rate. The duration of the delay is equal to the initial system delay. The encoder receives the transmission bit rates for the next system delay in the last system delay.

When the SDI video 120 received by the encoding system 200 is generated from video source material, the time duration for each video frame is fixed. None of the frames are repeated and thus none of the frames are dropped. Each frame enters the pipeline in sequence and incrementally moves forward along the pipeline. The pipeline has a time duration equal to the sum of the time durations of the individual frames in the pipeline. Consequently, the pipeline delay from the PREP 212 to the ENC 216 and the system delay are also fixed. When the SDI video 120 received by the encoding system 200 is generated from film source material, in the beginning of the encoding process, inverse telecine is disabled. There is no detection of repeat frames and thus the system delay remains the same as the initial system delay. After the pipeline is fully filled by the video frames, the inverse telecine is enabled. Repeat frames are detected and dropped before they enter the pipeline. For each dropped frame, the pipeline stops moving for one frame time so that frames already in the pipe do not incrementally move forward along the pipeline.

In the case of 3-2 pulldown in progressive television, for every five video frames that are to be encoded three are dropped (i.e., only two film frames are encoded). If the pipeline has a duration of one second, by the time the first film frame that enters the pipeline begins to be encoded the pipeline will have been delayed by ⅗ of a second, or 600 ms. Since the first film frame to be delivered to the encoding engine is delayed by 600 ms, the system delay is reduced by 600 ms. If the initial system delay is one second, the system delay is reduced to 400 ms by the time the first film frame reaches the encoding stage. By the time the first film frame reaches the encoding stage, the pipeline is filled with film frames and the system delay is no long incrementally reduced. However, the duration of each film frame is varied and consequently the system delay is varied. For instance, in the interlaced television, the variation of the system delay is within a field while in progressive television, the variation of the system delay is within a frame. In both instances (interlaced television and progressive television in film material), if the system delay is sufficiently large, the variation is negligible. However, during the transitions between the video source material and film source material, the variation of the system delay may be relatively large. For example, as described above, the system delay is reduced incrementally from one second to 400 ms.

Figure 5:
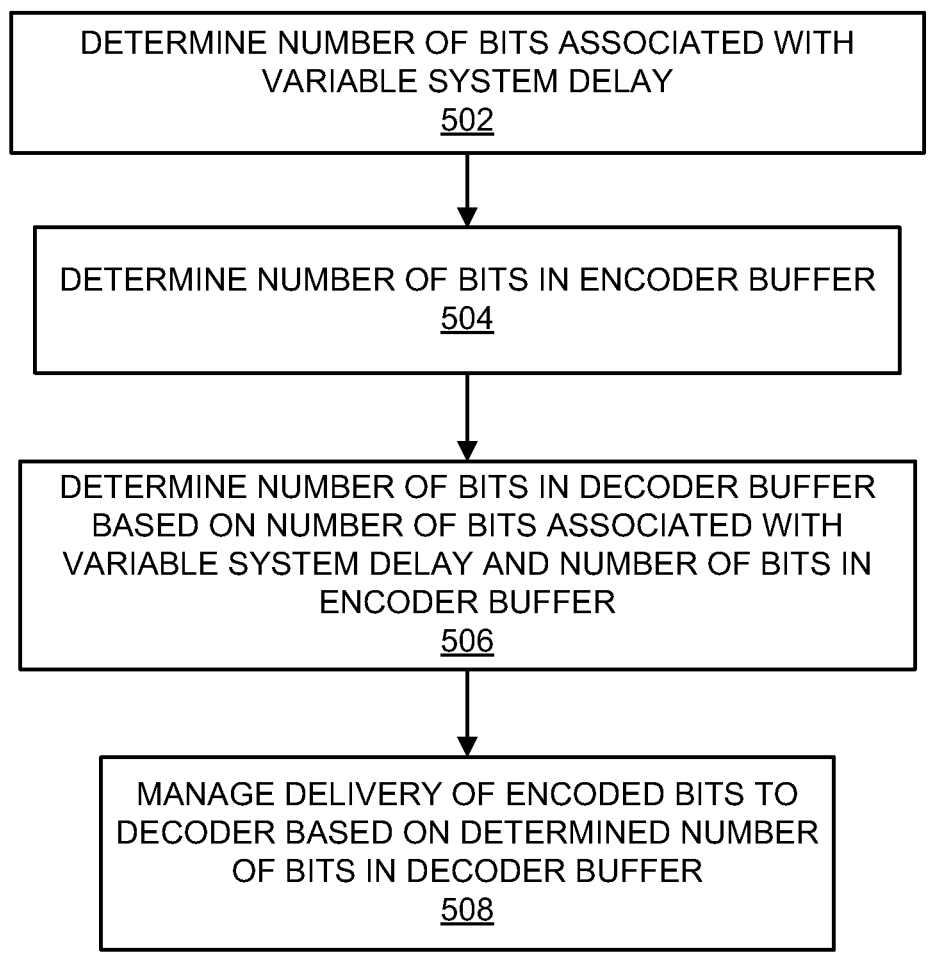
FIG. 5 illustrates a flow diagram of a method of managing delivery of encoded bits to a decoder, according to an embodiment.
Figure 6:
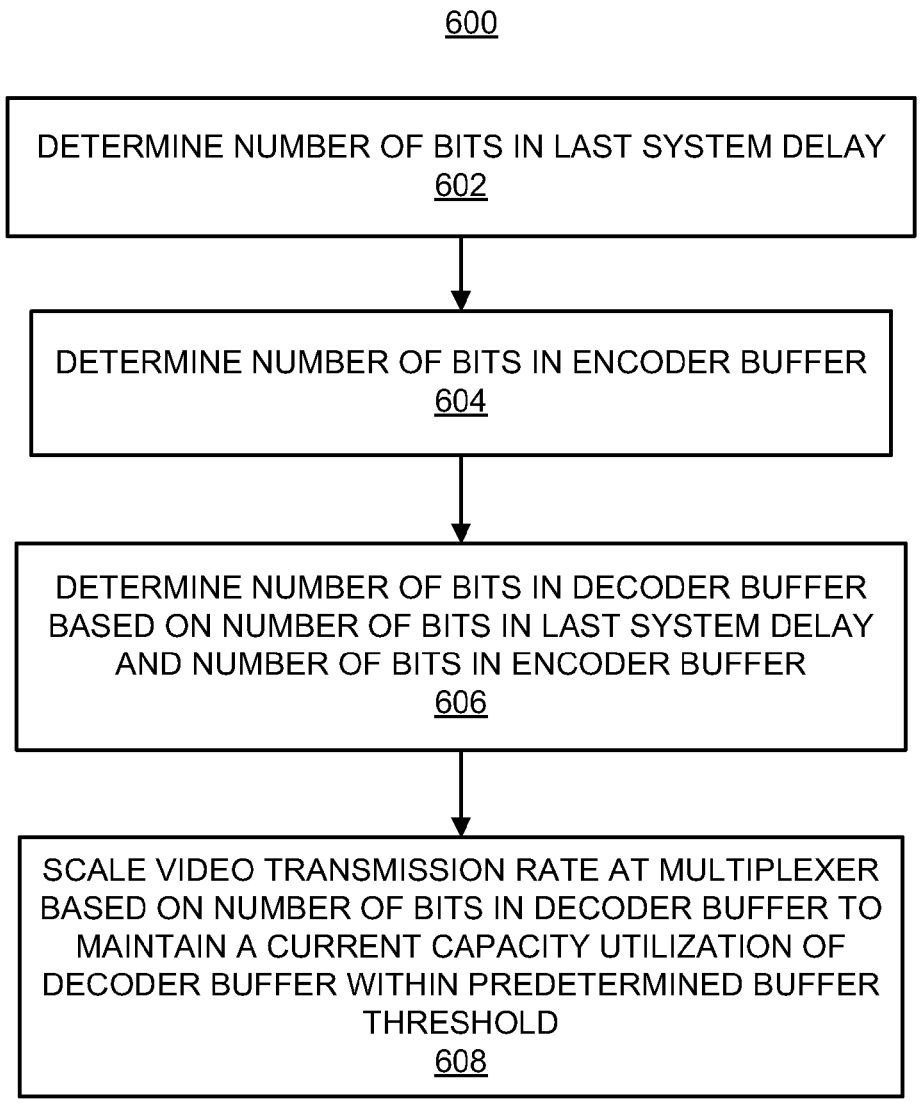
FIG. 6 illustrates a flow diagram of a method of managing delivery of encoded bits to a decoder, according to another embodiment.
Figure 7:
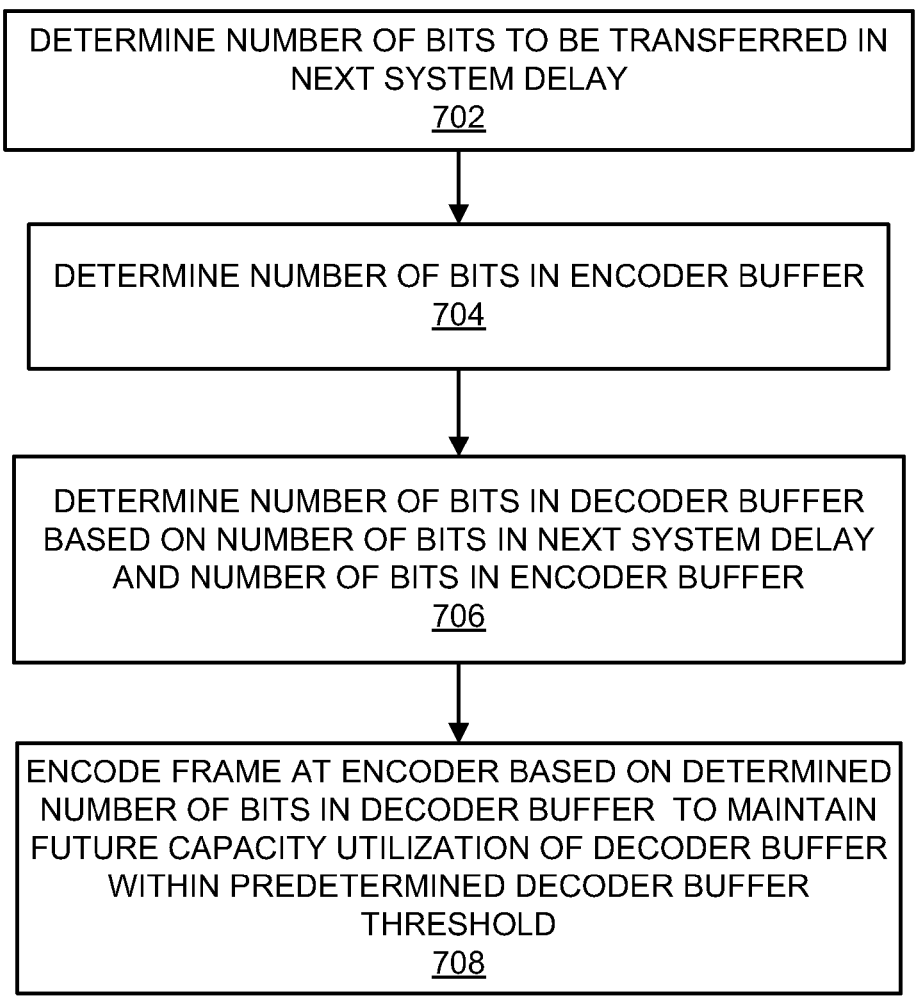
FIG. 7 illustrates a flow diagram of a method of managing delivery of encoded bits to a decoder, according to another embodiment.

Examples of methods in which the encoding system 100 may manage delivery of encoded bits to a decoder are described with respect to the following flow diagrams of the methods 500, 600 and 700 depicted in FIGS. 5, 6 and 7. It should be apparent to those of ordinary skill in the art that the methods 500, 600 and 700 represent generalized illustrations and that other steps may be added or existing steps may be removed, modified or rearranged without departing from the scopes of the methods 500, 600 and 700. In addition, the methods 500, 600 and 700 are described with respect to the encoding system 100 depicted in FIG. 1 by way of example and not of limitation, and thus, the methods 500, 600 and 700 may be used in other systems or devices.

Some or all of the operations set forth in the methods 500, 600 and 700 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

With regard to FIG. 5, there is shown a method 500 of managing delivery of encoded bits to a decoder, according to an embodiment. The method 500 may be applied in more specific embodiments at a multiplexer as shown with respect to FIG. 6 and the method 600 hereinbelow, or alternately, at an encoder as shown with respect to FIG. 7 and the method 700 hereinbelow.

At step 502, a number of bits associated with a variable system delay is determined, for instance, by the variable system delay bits calculating module 102, wherein the variable system delay is a time interval between each of a plurality of frames being encoded and decoded and is measured with respect to a current time for each of the plurality of frames.

At step 504, a number of bits in an encoder buffer is determined, for instance, by the encoder buffer bits calculating module 104. For instance, the encoder buffer bits calculating module 104 may determine the number of bits in the encoder buffer by summing a number of bits for each frame in the encoder buffer.

At step 506, a number of bits in a decoder buffer for a decoder configured to receive encoded bits from the encoder based on the bits associated with the variable system delay and the bits in the encoder buffer is determined, for instance, by the decoder buffer bits calculating module 106.

At step 508, delivery of the encoded bits to the decoder based on the number of bits determined to be in the decoder buffer is managed, for instance, by the encoded bits delivery-managing module 108. For instance, the encoded bits delivery-managing module 108 manages the delivery of the encoded bits at the multiplexer as described at step 608 of the method 600 hereinbelow. In addition, the encoded bits delivery-managing module 108 may manage the delivery of the encoded bits at the encoder as described at step 708 of the method 700 hereinbelow.

With regard to FIG. 6, there is shown a method 600 of managing delivery of encoded bits to a decoder, according to an embodiment. The method 600 is a specific embodiment of the method 500 and may be applied, for instance, at a multiplexer, for instance the multiplexer processor 220 in FIG. 2.

The method 600 may be implemented using a first decoder buffer model to calculate current capacity utilization of the decoder buffer. The multiplexer processor 220 (transmitter) may use the first decoder buffer model to determine a maximum transmission bit rate and a minimum transmission bit rate of each encoder in a statistical multiplexing system (not shown). The multiplexer processor 220 may use the first decoder buffer model to determine the maximum and minimum transmission bit rates based on a calculated current capacity utilization of the decoder buffer. In addition, the maximum transmission bit rate is a maximum rate of the multiplexer above which causes the decoder buffer to overflow. The minimum transmission bit rate is a minimum rate of the multiplexer, below which causes the decoder buffer to underflow.

Figure 3A:
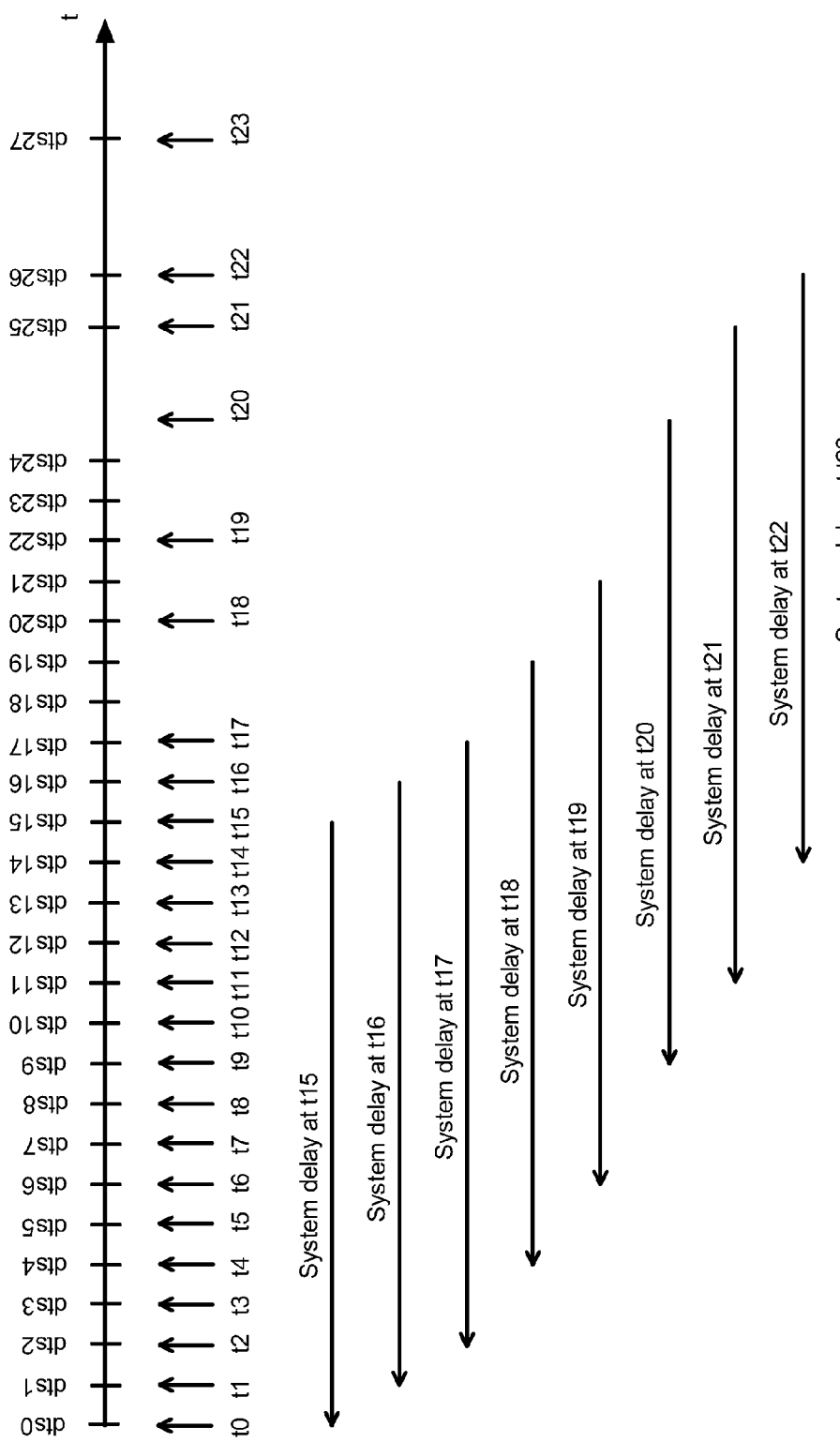
FIG. 3A illustrates a decoder model at a multiplexer during early transition from video to film, according to an embodiment.
Figure 3B:
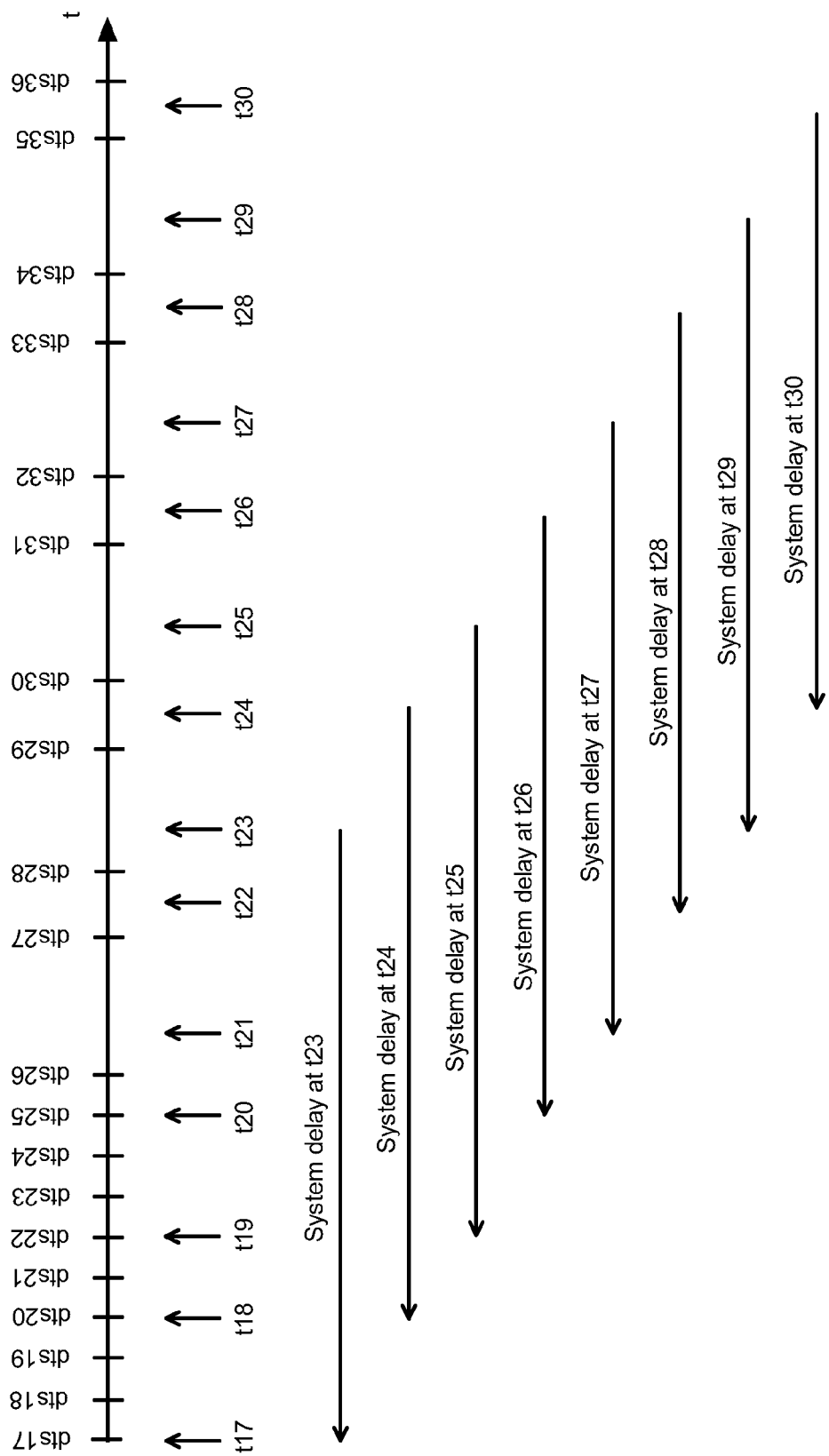
FIG. 3B illustrates a decoder model at a multiplexer during late transition from video to film, according to an embodiment of the invention.

At step 602, a number of bits generated in a last system delay is determined, for instance, by the variable system delay bits calculating module 102. The last system delay is the time interval from the current STC time minus the initial system delay to the current STC time. The duration of the last system delay is equal to the duration of the initial system delay. The encoder is configured to synchronize its system time clock (STC) to the input video clock. The last system delay at the encoding time for each frame during an early transition and a late transition from video to film for progressive television is illustrated in FIGS. 3A and 3B, respectively. It should be understood that FIGS. 3A and 3B are illustrative and not drawn to scale.

As shown in FIG. 3A, for example, an initial system delay T0 is set to the duration for 16 video frames, and the length of the pipeline is set to 9 encoding frames. The timer ISR 226 at the multiplexer processor 220 maintains the first decoder buffer model. At the encoding time for the first frame, the timer ISR 226 initializes the current STC time to the DTS of the first frame (dts0). At each interrupt, the timer ISR 226 updates the current STC time t by adding the elapsed time delta t to the previous STC time tp. The elapsed time delta t is measured by the input video clock.

Under the video mode, inverse telecine is disabled, the bits generated in the last system delay include the bits for the last 16 frames, as it is shown at the encoding time t15, t16, and t17. The encoding time is measured by the system time clock (STC). After the pipeline is filled with video frames, the inverse telecine is enabled. As the first film frame 26 enters the encoding pipeline, the encoding times for the video frames that are still in the pipeline are delayed, but the DTS of those video frames are not delayed. For example, the encoding time for frame 18 (t18) is delayed to dts20. At t18, the bits generated in the last system delay include only the bits for the last 14 frames (from frame 5 to frame 18). At this time, frame 3 and frame 4, which otherwise would be still in the decoder buffer, have already been pulled out of the decoder buffer because of the encoding delay. An effective system delay is thereby reduced by 2 video frames. At t19, the bits generated in the last system delay include only the bits for the last 13 frames; and the effective system delay reduces by 3 video frames.

The effective system delay is continuously reduced until the first film frame proceeds through the encoding pipeline, as it is shown in FIG. 3B. Above the time line in FIG. 3B are the DTS for each frame encoded. The DTS is inserted in the bit stream and transferred to the decoder. Below the time line are the encoding times for each frame measured by the STC. The encoding time is the time when a frame reaches the encoding stage in the pipeline. For example, the duration of the pipeline is illustrated as 9 encoding frames in FIG. 3B. When the 10th frame 9 enters the pipeline at STC t0, the first frame 0 is delivered to the encoding stage. When the first film frame 26 enters the pipeline at STC t17, the frame 17 is delivered to the encoding stage. Following the first film frame are two repeat frames. The two repeat frames are dropped and the pipeline stops for two video frame times. By the time the second film frame 27 enters the pipeline, the encoding time of the frame 18 is delayed by two video frame times to STC t18. Following the second film frame is a repeat frame. The repeat frame is dropped and the pipeline stops for one video frame time. By the time the third film frame 28 enters the pipeline, the encoding time of the frame 19 is delayed by 3 video frame times to STC t19. As the film frames enter the pipeline, the pipeline delay is incrementally increased. For example, the encoding time of frame 20 is delayed by 5 video frame times to STC t20, the encoding time of frame 21 is delayed by 6 video frame times to STC t21, the encoding time of frame 22 is delayed by 8 video frame times to STC 22, continuing for following frames. By the time the first film frame 26 reaches the encoding stage, the pipeline is no long incrementally increased. Because the duration of the pipeline is 9 encoding frames, when the pipeline is filled with film frames, the duration of 9 film frames in progressive television is equal to the duration of 22.5 video frames because of the 3-2 pull down. Therefore, after the first film frame reaches the encoding stage, the pipeline will have been delayed by 13 or 14 video frames (22.5 video frames minus 9 encoding frames).

Turning to the system delay, in FIG. 3B, the duration of initial system delay T0 is 16 video frames. When the encoding stage encodes frame 15 at STC t15, the decoder decodes frame 0. At STC t15, the number of bits generated in the preceding time interval T0 is equal to the sum of the bits for each frame from frame 0 to frame 15 (16 frames worth of bits). However, the encoding time of frame 18 is delayed by two video frames to STC t18. At STC t18, decoder decodes frame 5, the number of bits generated in the preceding time interval T0 is equal to the sum of the bits for each frames from frame 5 to frame 18 (14 frames worth of bits). After the first film frame reaches the encoding stage, the pipeline has been delayed by 13 or 14 frames. So at the encoding time of the first film frame 26 (STC t26), the decoder decodes frame 25 as shown in FIG. 3B, the number of bits generated in the preceding time interval T0 is equal to the sum of the bits of frame 25 and frame 26 (2 frame worth of bits). By the time the last video frame in the pipeline is encoded, the effective system delay reduces to the duration for 2 or 3 video frames. Throughout the entire film mode, because both the encoding time and the DTS for each frame are delayed by the same amount, the effective system delay remains at this smaller value until video is input. At the time the video has been input, the effective system delay will have been increased back to the initial system delay T0 during the transition from the film mode to the video mode.

At step 604, a number of bits in an encoder buffer as described for instance at step 504 of the method 500 hereinabove is determined, for instance, by the encoder buffer bits calculating module 104.

At step 606, a number of bits in a decoder buffer for a decoder configured to receive encoded bits from the encoder based on the bits generated in the last system delay and the bits in the encoder buffer are determined, for instance, by the decoder buffer bits calculating module 106. The decoder buffer bits calculating module 106 may determine the number of bits currently stored in the decoder buffer using a decoder buffer model at the multiplexer is described as follows:

$$\text{Bits in decoder buffer }(t) = \text{Bits generated in the last system delay} - \text{Bits in encoder buffer }(t). \quad \text{Eqn (1)}$$

Eqn (1) may be restated as the bits generated in the last system delay being either in the encoder buffer or in the decoder buffer, and the bits generated earlier are already pulled out of the decoder buffer.

The multiplexer processor 220 may maintain the decoder buffer model to monitor a current capacity utilization of the decoder buffer. If the decoder buffer model indicates high current capacity utilization of decoder buffer, the multiplexer processor 220 reduces the transmission bit rate to avoid the decoder buffer overflow. For an encoder with long system delay, if zero stuffing is not desirable, it is essential for the multiplexer processor 220 to maintain an accurate decoder buffer model for the encoder may not be able to generate a frame that is sufficiently large to avoid the decoder buffer overflow.

The timer ISR 226 maintains a queue for both the latest DTS [64] and the latest FRAME SIZE [64], for example in a system using one second for the initial system delay. In progressive television, the frame rate is 60 frames per second. The 64 bits are sufficiently large and is multiple of 2 for efficient programming. The following code in Table 1 illustrates the decoder buffer model maintained by the timer ISR 226:

TABLE 1

```
If (first frame == TRUE)
    t = dts0;
else
    t = tp + delta t;
tp = t;
system bits = 0;
for(i = 0; i < 64; i++) {
    if( (t-DTS[i]) < T0 )
        system bits = system bits + FRAME SIZE[i];
}
dec bits = system bits – enc bits;
```

As shown in Table 1, the system bits are a number of bits generated in the last system delay. The enc bits are a number of bits in the encoder buffer. The dec bits are a number of bits in the decoder buffer. FRAME SIZE is the number of bits generated for a encoding frame. The elapsed time delta t is synchronized to the video input clock, as is the DTS.

The decoder buffer model described in the code, as shown in Table 1, accurately calculates the current capacity utilization of the decoder buffer regardless of whether in video mode, in film mode, or during the transitions between video mode and film mode. The decoder buffer model automatically tracks the effective system delay without explicitly calculating the effective system delay. Also, through use of the decoder buffer model disclosed herein, errors do not persist or cumulate as with some conventional recursive models.

At step 608, delivery of the encoded bits is managed, for instance, by the encoded bits delivery-managing module 108, by scaling a transmission bit rate at a multiplexer associated with the encoder to maintain the current capacity utilization of the decoder buffer within a predetermined decoder buffer threshold in proportionate response to the determination of the current capacity utilization.

With regard to FIG. 7, there is shown a method 700 of managing delivery of encoded bits to a decoder, according to another embodiment. The method 700 may be applied, for instance, at an encoder.

At the encoding time for each frame, the encoder estimates the capacity utilization of the decoder buffer at the time this frame is going to be decoded. In contrast to the multiplexer processor 220 that calculates the capacity utilization of the decoder buffer at the current time while a previously encoded frame is decoded as described in the method 600 hereinabove, the process at the encoder estimates the future capacity utilization of the decoder buffer at the DTS time, which is at a future time.

The encoder uses a second decoder buffer model to determine the maximum frame size of the frame to be encoded. The determination is based on the future capacity utilization of the decoder buffer when this frame is to be decoded. The maximum frame size of the frame to be encoded is equal to the capacity utilization of the decoder buffer at the time the frame is decoded. If the encoder produces more bits than the maximum frame size when encoding this frame, the decoder buffer will underflow as there will not be enough time to transmit the entire frame to the decoder prior to decoding this frame. As such, the encoder is the first line to protect the decoder buffer underflow. If the encoder produces more bits than the maximum frame size, the rate controller of the statistic multiplexing system may resolve the decoder buffer underflow for the encoder by borrowing bandwidth from other encoders in the system. The multiplexer processor 220 in the encoder using a minimum transmission bit rate request to initiate this process.

At step 702, a number of bits to be transferred in a next system delay is determined, for instance, by the variable system delay bits calculating module 102. The next system delay is an instance of the variable system delay and is a time interval between each of a plurality of frames being encoded and decoded and is measured with respect to a current time for each of the plurality of frames. The next system delay is varied and the encoder 102a determines the next system delay to be equal to the current system delay, which the encoder 102a calculates based on a time interval from the current PCR time when a frame is to be encoded to the decoding time DTS of this frame. The encoder initializes the PCR at the encoding time of the first frame to be the DTS of the first frame minus the initial system delay T0. The value of the PCR is thereafter incremented and synchronized to the input video clock. The encoder inserts the current PCR time and the decoding time DTS for each frame into the video stream to indicate to an associated decoder when that frame should be decoded.

At step 704, the encoder 102a determines a number of bits in an encoder buffer as described for instance at step 504 of the method 500 hereinabove.

At step 706, a number of bits in a decoder buffer for a decoder configured to receive encoded bits from the encoder based on the bits associated with the variable system delay and the bits in the encoder buffer is determined, for instance, by the decoder buffer bits calculating module 106. At the encoding time for each frame, the decoder buffer model at the encoder is described as follows:

$$\text{Bits in decoder buffer }(dtsn) = \text{Bits to be transferred in the next system delay} - \text{Bits in encoder buffer }(tn). \quad \text{Eqn (2)}$$

Figure 4A:
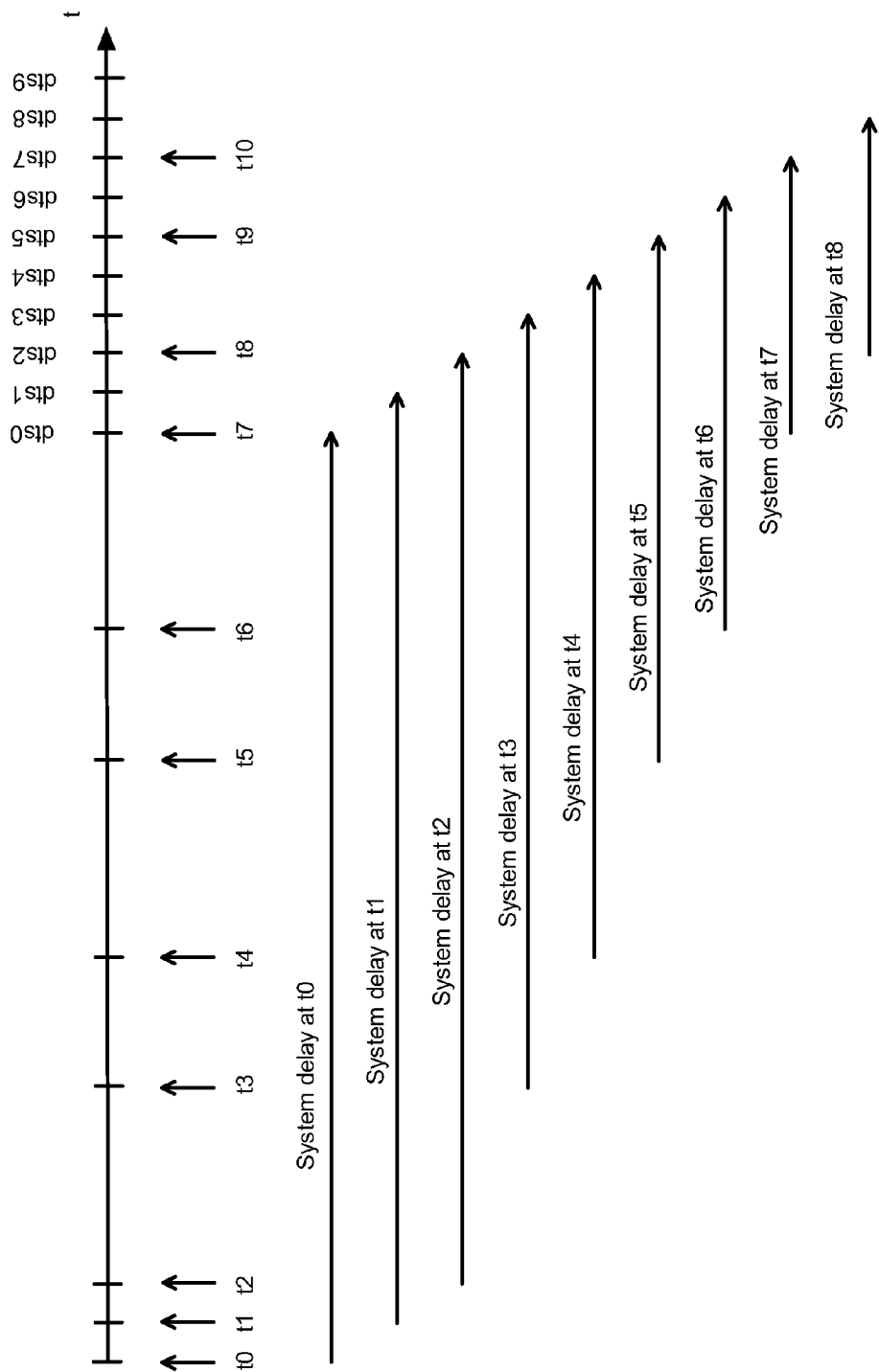
FIG. 4A illustrates a decoder model at an encoder during early transition from video to film, according to an embodiment.

In Eqn (2), the next system delay is the time interval from the current time (tn) to the DTS time (dtsn). The current PCR time (t0) is initialized to dts0−T0 at the time the first frame is encoded. For interlaced television, the next system delay at the encoding time for each frame is shown in FIGS. 4A and 4B.

The decoder buffer model at the encoder may be restated as follows. For all the bits to be transferred in the next system delay, at the DTS of the current encoding frame, those bits that are currently in the encoder buffer will already have been pulled out of the decoder buffer because of the earlier DTS of their corresponding frames. The rest of the bits remain in the decoder buffer.

The timer ISR 226 relates the video transmission bit rates to the encoding process at the encoder, for instance, 1 second ahead of the current time, so the encoder has an indication of each of the transmission bit rates in the next system delay. For example, in instances in which the timer ISR 226 updates the transmission bit rate every 800 microseconds, the encoder may estimate the bits to be transferred in the next system delay, for instance, by the following procedure:

The current decoder buffer fullness is first determined as shown in Table 1. The bits to be transferred from the DTS of the $k^{th}$ frame to be decoded to the DTS of the next frame in line to be decoded can be calculated as follows:

$$\text{bits}[k] = \text{Max}\{\Sigma(R_i * 800 * 10^{-6}) + R_{n[k]} * t_m[k], \text{ decoder buffer available space}[k]\} \quad \text{Eqn (3)}$$

In Eqn (3), the bits[k] is the bits to be transmitted from the DTS of the $k^{th}$ frame to be decoded to the DTS of the next frame in line to be decoded; $R_i$ is one of the first n[k] transmission bit rates from the DTS of the $k^{th}$ frame to be decoded to the DTS of the next frame in line to be decoded; $R_{n[k]}$ is the $(n[k]+1)^{th}$ (counting from 0) transmission bit rate from the DTS of the $k^{th}$ frame to be decoded to the DTS of the next frame in line to be decoded; and $$n[k] = (int)((\text{time period from the DTS of the } k^{th} \text{ frame to be decoded to the DTS of the next frame in line to be decoded in second})/(800 * 10^{-6})) \quad \text{Eqn (4)}$$

$$t_m[k] = (\text{time period from the DTS of the } k^{th} \text{ frame to be decoded to the DTS of the next frame in line to be decoded in second}) - n[k] * (800 * 10^{-6}) \quad \text{Eqn (5)}$$

$$i = \{0, \ldots, n[k]-1\} \quad \text{Eqn (6)}$$

$$\text{decoder buffer available space}[k] = \text{decoder buffer size} - \text{decoder buffer fullness}[k] \quad \text{Eqn (7)}$$

The decoder buffer fullness at the DTS of the $k^{th}$ frame to be decoded is recursively calculated from the current decoder buffer fullness as follows:

$$\text{decoder buffer fullness}[k] = \text{decoder buffer fullness}[k-1] + \text{bits}[k-1] - \text{FRAME SIZE}[k-1]. \quad \text{Eqn (8)}$$

$$\text{decoder buffer fullness}[0] = \text{current decoder buffer fullness} + \text{bits}[0]. \quad \text{Eqn (9)}$$

In Eqn (9) the current decoder buffer fullness is calculated by the MUX processor 220 as described in Table 1; bits[0] is the bits transferred from the current time to the DTS of the first frame in line to be decoded, and $$\text{bits}[0] = \text{Max}\{\Sigma(R_i * 800 * 10^{-6}) + R_{n[0]} * t_m[0], \text{ decoder buffer size} - \text{current decoder buffer fullness}\} \quad \text{Eqn (10)}$$

In Eqn (10) $R_i$ is one of the first n[0] transmission bit rates from current time to the DTS of the first frame in line to be decoded; $R_{n[0]}$ is the $(n[0]+1)^{th}$ (counting from 0) transmission bit rate from current time to the DTS of the first frame in line to be decoded; and $$n[0] = (int)((\text{time period from current time to the DTS of the first frame in line to be decoded in second})/(800 * 10^{-6})) \quad \text{Eqn (11)}$$

$$t_m[0] = (\text{time period from current time to the DTS of the next frame in line to be decoded in second}) - n[0] * (800 * 10^{-6}) \quad \text{Eqn (12)}$$

$$i = \{0, \ldots, n[0]-1\} \quad \text{Eqn (13)}$$

The bits to be transferred in the next system delay can be calculated as follows:

$$\text{sys bits} = \Sigma \text{bits}[k] \quad \text{Eqn (14)}$$

In Eqn (14) k={0, ..., number of frames to be decoded in the next system delay}.

FIG. 4A shows the next system delay at the encoding time for each frame during the early transition from video to film. FIG. 4B shows the next system delay at the encoding time for each frame during the late transition from video to film. Here, as an example, the initial system delay $T_0$ is set to the duration for 16 video frames; the length of the pipeline is set to 9 encoding frames. At the encoding time for the first frame, the ENC process initializes the current PCR time t0 to the DTS of the first frame minus the initial system delay ($dts_0-T_0$). At the encoding time for each frame, the ENC updates the current PCR time t by adding the elapsed time delta t to the previous time tp. The elapsed time is measured in the input video clock. The ENC also maintains a queue for the transmission bit rates in the next one second R[1250]. The following code shows the decoder buffer model maintained by the ENC:

TABLE 2

```
If (first frame == TRUE)
    t = DTS[0] - T0;
else
    t = tp + delta t;
tp = t;
    sys delay = DTS[n] - t;   // next system delay
    idx = index of the first frame to be decoded in the next system
    delay;
    N= number of frames to be decoded in the next system delay;
    // decoder buffer available space
    vbv avail = decoder buffer size -current decoder buffer fullness;
    pdts = DTS[idx];
    psize = FRAME SIZE[idx];
    time period = pdts - t;
    n = (time period * 1250) / 90000;
    m = (time period * 1250) - (n * 90000);
    bits = 0;
    j= index of the first transmission bit rate of the first frame to be
    decoded;
    for (i = 0; i < n; i++)
        bits = bits + R[i+j];
    // bits to be sent from the current time to the DTS of the first frame
    to be decoded
    // in the next system delay
    bits = (bits / 1250) + (m * R[n+j]) / (90000 * 1250);
    bits = (vbv avail <= bits)? vbv avail: bits;
    // bits to be sent in the next system delay
    sys bits = bits;
    vbv avail = vbv avail - bits to be sent;
    // loop through all the remaining frames to be decoded in the next
    system delay
    for (k = 1; k < N; k++)
    {
        tdts = DTS[idx + k];
        time period = tdts - pdts;
        n = (time period * 1250) / 90000;
        m = (time period * 1250) - (n * 90000);
        bits = 0;
        j=index of the first tansmission bit rate of the kth frame;
        for (i = 0; i < n; i++)
            bits = bits + R[i+j];
        // bits to be sent from DTS of the kth frame to the (k+1)th frame
        bits = (bits / 1250) + (m * R[n+j]) / (90000 * 1250);
        vbv avail = vbv avail + psize;
        bits = (vbv avail <= bits)? vbv avail: bits;
        // bits to be sent in the next system delay
        sys bits = sys bits + bits;
        vbv avail = vbv avail - bits;
        pdts = tdts;
        psize = FRAME SIZE[idx+k];
    }
    dec bits = sys bits - enc bits
```

In which the sys bits is equal to the bits to be transmitted in the next system delay; the enc bits is equal to the bits currently in the encoder buffer; the dec bits is equal to the bits in the decoder buffer at $dts_n$; $dts_n$ is the DTS of the current frame to be encoded; sys delay is the next system delay; t, $dts_n$, and sys delay are all measured in 90 kHz clock. Also the elapsed time delta t is synchronized to the video input clock just as is the DTS.

As shown in FIG. 4A, at video mode, the next system delay is equal to the initial system delay $T_0$, as it is shown at the encoding time $t_0$, $t_1$, and $t_2$. As the first film frame 26 enters the encoding pipeline, the encoding times for the video frames that are still in the pipeline are delayed, but the DTS of those video frames are not delayed. For example, the encoding time for frame 4 ($t_3$) is delayed by 3 video frames instead of 1 video frame. At $t_3$, the next system delay is equal to $T_0-2d$ (d is the duration of a video frame). At $t_4$, the next system delay is equal to $T_0-3d$.

The next system delay continuously reduces until the first film frame proceeds through the encoding pipeline, as it is shown in FIG. 4B. By the time the last video frame in the pipeline is encoded, the next system delay reduces to the duration for 2 or 3 video frames. Throughout the entire film mode, because both the encoding time and the DTS for each frame are delayed by the same amount, the next system delay remains at this smaller value until video is input. At that point, the next system delay will have been increased back to the initial system delay $T_0$ during the transition from film mode to video mode.

At step 708, delivery of the encoded bits to the decoder based on the number of bits determined to be in the decoder buffer is managed, for instance, by the encoded bits delivery-managing module 108, by determining a future capacity utilization of the decoder buffer at a projected time that a frame to be currently encoded will be decoded. The encoded bits delivery-managing module 108 encodes the frame at the encoder using a maximum frame size to maintain the future capacity utilization of the decoder buffer at the time the frame to be currently encoded will be decoded within a predetermined decoder buffer threshold in proportionate response to the determination of the future capacity utilization.

In contrast to the multiplexer processor 220 that calculates the current capacity utilization of the decoder buffer at any time instance, the encoder only has to determine the future capacity utilization of the decoder buffer when a frame is encoded. In order to maintain appropriate capacity utilization of the decoder buffer, the encoder estimates the future capacity utilization of the decoder buffer at the decoding time with a relatively high level of accuracy so that the appropriate frame size is generated. If the future capacity utilization of the decoder buffer is likely to be relatively low, the encoder generates a smaller frame size to enable the future capacity utilization decoder buffer to be built up after this frame is pulled out the decoder buffer.

Figure 8:
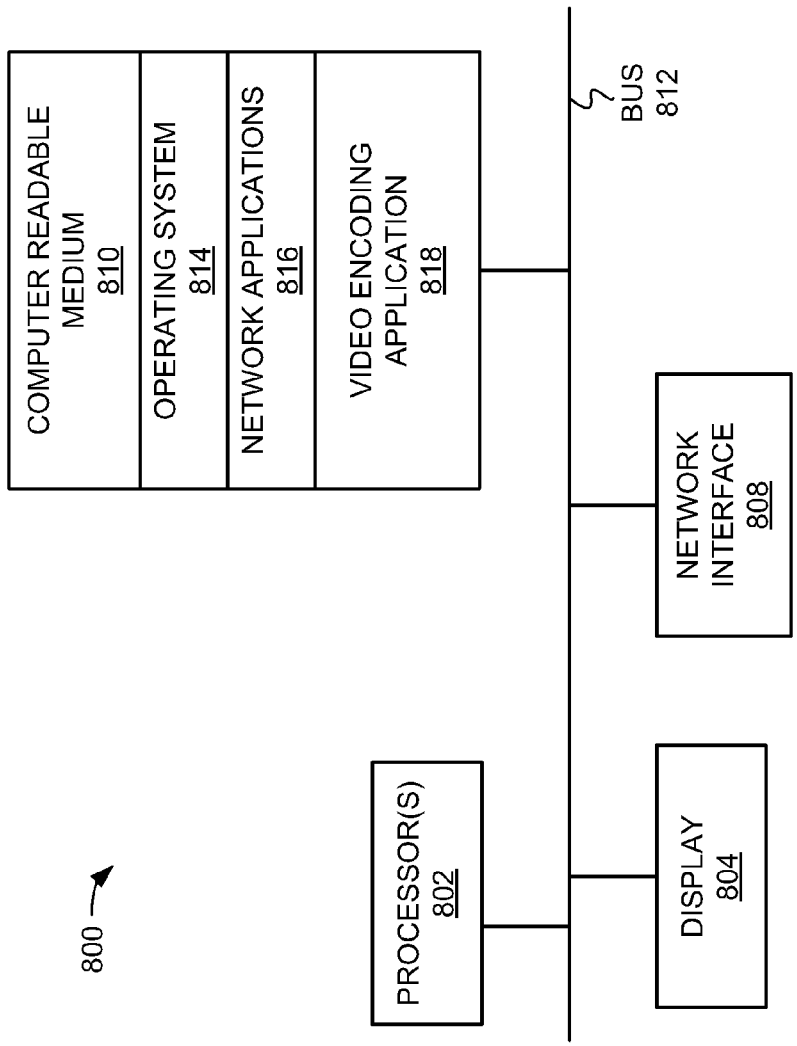
FIG. 8 shows a block diagram of a computer system that may be used in operating an encoder, according to an embodiment.

Turning now to FIG. 8, there is shown a schematic representation of a computing device 800 configured in accordance with embodiments of the present invention. The computing device 800 includes one or more processors 802, such as a central processing unit; one or more display devices 804, such as a monitor; one or more network interfaces 808, such as a Local Area Network LAN, a wireless 802.11x LAN, a 3G mobile WAN or a WiMax WAN; and one or more computer-readable mediums 810. Each of these components is operatively coupled to one or more buses 812. For example, the bus 812 may be an EISA, a PCI, a USB, a FireWire, a NuBus, or a PDS.

The computer readable medium 810 may be any suitable medium that participates in providing instructions to the processor 802 for execution. For example, the computer readable medium 810 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 810 may also store other software applications, including word processors, browsers, email, Instant Messaging, media players, and telephony software.

The computer-readable medium 810 may also store an operating system 814, such as Mac OS, MS Windows, Unix, or Linux; network applications 816; and a video encoding/decoding application 818. The operating system 814 may be multi-user, multiprocessing, multitasking, multithreading, real-time and the like. The operating system 814 may also perform basic tasks such as recognizing input from input devices, such as a keyboard or a keypad; sending output to the display 804; keeping track of files and directories on medium 410; controlling peripheral devices, such as disk drives, printers, image capture device; and managing traffic on the one or more buses 812. The network applications 816 include various components for establishing and maintaining network connections, such as software for implementing communication protocols including TCP/IP, HTTP, Ethernet, USB, and FireWire.

The video encoding application 818 provides various software components for operating an encoder, as discussed above. In certain embodiments, some or all of the processes performed by the application 818 may be integrated into the operating system 814. In certain embodiments, the processes can be at least partially implemented in digital electronic circuitry, or in computer hardware, firmware, software, or in any combination thereof, as also discussed above.

As described above, the embodiments disclosed herein provide an encoder with variable system delay, including those using interlaced and progressive processing pipelines, with an initial system delay and decoder buffer models that substantially avoid decoder buffer underflow.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

What is claimed is:

1. A method for controlling delivery of encoded bits to a decoder, the method comprising:
    determining a number of bits associated with a variable system delay, wherein the variable system delay is a time interval between each of a plurality of frames being encoded and decoded and is measured with respect to a current time for each of the plurality of frames;
    determining a number of bits in an encoder buffer for an encoder;
    determining a number of bits in a decoder buffer for a decoder configured to receive encoded bits from the encoder based on the bits associated with the variable system delay and the bits in the encoder buffer; and
    controlling delivery of the encoded bits to the decoder based on the number of bits determined to be in the decoder buffer,
    wherein the variable system delay is a last system delay, the last system delay is a time interval from the current time minus an initial system delay to the current time, and the number of bits associated with the variable system delay comprises a number of bits generated in the last system delay; and
    wherein determining the number of bits currently stored in the decoder buffer for the decoder comprises subtracting the bits in the encoder buffer from the number of bits generated in the last system delay.

2. The method of claim 1, wherein determining the number of bits generated in the last system delay further comprises:
    determining a number of frames encoded in the last system delay; and
    determining the number of bits generated in the last system delay by adding a frame size in bits for each frame encoded in the last system delay.

3. A method for controlling delivery of encoded bits to a decoder, the method comprising:
    determining a number of bits associated with a variable system delay, wherein the variable system delay is a time interval between each of a plurality of frames being encoded and decoded and is measured with respect to a current time for each of the plurality of frames;
    determining a number of bits in an encoder buffer for an encoder;
    determining a number of bits in a decoder buffer for a decoder configured to receive encoded bits from the encoder based on the bits associated with the variable system delay and the bits in the encoder buffer; and
    controlling delivery of the encoded bits to the decoder based on the number of bits determined to be in the decoder buffer,
    wherein the variable system delay is a next system delay, wherein the next system delay is a time interval from the current time to a decode time stamp time (DTS time), and the DTS time is a time assigned for the decoder to decode a frame, and the number of bits associated with the variable system delay comprises a number of bits to be transferred in the next system delay; and
    wherein determining the number of bits in the decoder buffer comprises subtracting the number of bits in the encoder buffer from the number of bits to be transferred in the next system delay.

4. The method of claim 3, wherein controlling delivery of the encoded bits to the decoder using the number of bits in the decoder buffer further comprises:
    determining a future capacity utilization of the decoder buffer at a projected time that a frame to be currently encoded will be decoded; and
    encoding the frame at the encoder using a maximum frame size to maintain the future capacity utilization of the decoder buffer at the time the frame to be currently encoded will be decoded within a predetermined decoder buffer threshold in proportionate response to the determination of the future capacity utilization.

5. The method of claim 3, further comprising:
    determining system bits (sys bits) according to a current capacity utilization of the decoder buffer calculated by a MUX processor and transmission bit rates for the next system delay received in a last system delay.

6. The method of claim 1, wherein determining the number of bits associated with the variable system delay further comprises:

determining a maximum pipeline delay based on a length of an encoding pipeline measured in a number of encoding frames;

accessing a predetermined initial delay; and determining a range of variation for the variable system delay based on the maximum pipeline delay and the predetermined initial delay.

7. An apparatus for controlling delivery of encoded bits to a decoder, the apparatus comprising:

one or more modules configured to determine a number of bits associated with a variable system delay, wherein the variable system delay is a time interval between each of a plurality of frames being encoded and decoded and is measured with respect to a current time for each of the plurality of frames, determine a number of bits in an encoder buffer for an encoder, determine a number of bits in a decoder buffer for a decoder configured to receive encoded bits from the encoder based on the bits associated with the variable system delay and the bits in the encoder buffer, and control delivery of the encoded bits to the decoder based on the number of bits determined to be in the decoder buffer; and a processor configured to implement the one or more modules, wherein the variable system delay is a last system delay, the last system delay is a time interval from the current time minus an initial system delay to the current time and the number of bits associated with the variable system delay comprises a number of bits generated in the last system delay; and wherein the one or more modules are further configured to determine the number of bits in the buffer for the decoder by subtracting the bits in the encoder buffer from the number of bits generated in the last system delay.

8. The apparatus of claim 7, wherein to determine the number of bits generated in the last system delay the one or more modules are further configured to determine a frame size in bits for a latest frame, determine a number of bits generated in a system delay preceding the last system delay, and add the determined frame size to the number of bits generated in the system delay preceding the last system delay.

9. An apparatus for controlling delivery of encoded bits to a decoder, the apparatus comprising:

one or more modules configured to determine a number of bits associated with a variable system delay, wherein the variable system delay is a time interval between each of a plurality of frames being encoded and decoded and is measured with respect to a current time for each of the plurality of frames, determine a number of bits in an encoder buffer for an encoder, determine a number of bits in a decoder buffer for a decoder configured to receive encoded bits from the encoder based on the bits associated with the variable system delay and the bits in the encoder buffer, and control delivery of the encoded bits to the decoder based on the number of bits determined to be in the decoder buffer; and a processor configured to implement the one or more modules, wherein the variable system delay is a next system delay, wherein the next system delay is a time interval from the current time to a decode time stamp time (DTS time) and the DTS time is a time assigned for the decoder to decode a frame, and the number of bits associated with the variable system delay comprises a number of bits to be transferred in the next system delay; and wherein the one or more modules are configured to determine the number of bits in the decoder buffer by subtracting the number of bits in the encoder buffer from the number of bits to be transferred in the next system delay.

10. The apparatus of claim 9, wherein to manage delivery of the encoded bits to the decoder using the number of bits in the decoder buffer, the one or more modules are further configured to determine a capacity utilization of the decoder buffer at a projected time that a frame to be currently encoded will be decoded using the decoder buffer model, and encode the frame at the encoder using a number of bits to maintain the capacity utilization of the decoder buffer at the time the frame to be currently encoded will be decoded within a predetermined decoder buffer threshold in proportionate response to the determination of the capacity utilization.

* * * * *